United States Patent
Abe et al.

(10) Patent No.: US 7,842,120 B2
(45) Date of Patent: Nov. 30, 2010

(54) METHOD OF OBTAINING COPPER FROM ORE

(75) Inventors: Yoshifumi Abe, Hitachi (JP); Hiroshi Hosaka, Hitachi (JP); Kazuaki Takebayashi, Hitachi (JP); Yasunari Ishiguro, Hitachi (JP); Akira Yoshimura, Hitachi (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 188 days.

(21) Appl. No.: 12/219,894

(22) Filed: Jul. 30, 2008

(65) Prior Publication Data
US 2009/0241732 A1    Oct. 1, 2009

(30) Foreign Application Priority Data
Mar. 27, 2008    (JP)    ................ 2008-084934

(51) Int. Cl.
*C22B 15/00*    (2006.01)
*C22B 3/08*    (2006.01)

(52) U.S. Cl. ............................. 75/743; 423/36
(58) Field of Classification Search .............. 75/743; 423/36
See application file for complete search history.

(56) References Cited

U.S. PATENT DOCUMENTS

| | | | | |
|---|---|---|---|---|
| 4,023,964 A | * | 5/1977 | DeMarthe et al. | ........... 205/605 |
| 4,337,128 A | * | 6/1982 | Haakonsen et al. | ........ 205/582 |
| 5,232,491 A | * | 8/1993 | Corrans et al. | ............... 75/743 |
| 7,510,593 B2 | * | 3/2009 | Heimala et al. | ............... 75/743 |
| 7,682,420 B2 | * | 3/2010 | Abe et al. | ...................... 75/743 |

FOREIGN PATENT DOCUMENTS

| AU | 669906 | 1/1994 |
|---|---|---|
| CA | 1105410 | 7/1981 |

* cited by examiner

*Primary Examiner*—George Wyszomierski
*Assistant Examiner*—Tima M McGuthry-Banks
(74) *Attorney, Agent, or Firm*—Birch, Stewart, Kolasch & Birch, LLP

(57) ABSTRACT

A method of obtaining copper from feedstock includes: providing feedstock into acid solution including chloride and bromide of one of alkali metal and alkali earth metal, and one of chloride of copper and iron and bromide of copper and iron; leaching monovalent copper and divalent copper with use of oxidizing power of at least one of iron ion and copper ion, with air being blown into the acid solution under an atmospheric pressure at a temperature less than a boiling point of the acid solution; solid-liquid separating the acid solution; blowing air into the solution; oxidizing copper in the solution; coprecipitating iron and impurity; extracting copper from the solution from which deposition including the coprecipitate is separated; obtaining the extracted copper into sulfuric acid solution as copper sulfate; obtaining copper from the copper sulfate; and recycling hydrochloric acid generated in the extracting in another copper leaching.

5 Claims, 1 Drawing Sheet

METHOD OF OBTAINING COPPER FROM ORE

BACKGROUND OF THE INVENTION

1. Field of the Invention

The present invention relates a method of obtaining objective metal by leaching and dissolving valuable metal in ore into aqueous solution, and in particular, relates to a method of separating and obtaining copper by leaching the copper in one of series of processes.

2. Description of the Related Art

Copper sulfide ore is generally subjected to a dry processing in which the copper sulfide ore is melted at a temperature more than 1000 degrees C, and impurity such as iron is fixed in a slag and separated from the copper sulfide ore. In the dry processing, noble metal is concentrated and obtained into purified copper sulfide ($Cu_2S$) that is called copper matte and is manufactured with the melting process. With the method, sulfur in the copper sulfide ore is gasified into sulfur dioxide. Therefore, exhaust gas treatment is needed. And high temperature is needed in a purifying treatment after melting. This results in a plenty of consumption of fuel. Further, there is a problem that increase of impurity grade of the matte results in increase of cyclic material and treatment efficiency is reduced. And there is a problem that the treatment efficiency is reduced with respect to low copper-grade material because ratio of sulfur and copper in feedstock is limited.

In order to solve the problems such as the exhaust gas treatment, a plenty of consumption of fuel, or limitation with respect to impurity of feedstock and copper grade, there are being developed a variety of processes called wet processing in which copper sulfide ore is treated in aqueous solution.

Leaching technology with sulfuric acid is established in wet refining process of copper from copper ore. And a commercial scale plant using SX-EW method, in which solvent extraction and electrolytic winning are combined, is constructed and operated.

The leaching of copper with the sulfuric acid bath is, however, generally used for ore mainly composed of oxide ore and is used for only a selected sulfide ore, because the leaching has problems that the reaction thereof is slow and noble metal may not be obtained. The leaching of copper from copper concentrate having high copper grade caused by ore dressing is not in practical use, because the leaching has low copper-leaching rate and difficult obtainment of noble metal as well as slow reaction.

The above-mentioned wet processing needs high temperature and high pressure in order to enlarge the leaching rate of copper. The quality of obtained electrodeposited copper is degraded or a structure of an electrolytic bath for obtaining gets complex, if the copper-leaching-rate is enlarged with chloride solution.

Au Patent No. 669906 "Production of metals from minerals" (hereinafter referred to as Document 1) discloses a method of leaching copper from sulfide ore with chloride bath using chloride aqueous solution, as a method not performing high-temperature and high-pressure treatment. The method disclosed in Document 1 leaches copper as $Cu^+$ from sulfide ore under air atmosphere with Cl—Br-based acid electrolytic solution including $Cu^{2+}$ that is generated with electrolytic winning and has high oxidation-reduction potential. Thus $Cu^+$ is obtained with electrolytic winning.

However, this method treats halide (halex such as $BrCl_2^-$) that is difficult to treat during leaching and is poisonous. The electrolytic winning of copper in chloride bath causes high cost because copper grade is low and refinement is needed. And, equipment gets complex, and controlling gets difficult.

CA Patent No. 1105410 "Method of obtaining copper from sulphurized concentrates" discloses a method of obtaining copper having high grade, in which copper concentrate is leached out in chloride bath, copper ion is extracted into organic solvent from the chloride bath with solvent extraction method, organic phase and aqueous phase are separated from each other, divalent copper extracted into the organic solvent is converted into copper sulfate when the organic phase is in touch with sulfuric acid, and the copper is obtained with conventional electrolytic winning with use of sulfuric acid bath. In the method, copper is extracted with air being blown into the chloride bath. Therefore, phase splitting is degraded because of air oxidation and deposition of iron in solvent, and loss of extract agent is caused by contamination of the extract agent into air. At the present time, the wet smelting process of copper with use of the chloride bath is not profitable in cost and administration, compared to another mine development process. This results in difficulty in grand-scale mine treatment process.

SUMMARY OF THE INVENTION

The present invention has been made in view of the above circumstances and provides a method of leaching copper from copper sulfide ore with chloride bath and leaching and obtaining more than 98% of copper in copper sulfide ore with use of only air without specific oxidant and specific equipment.

According to an aspect of the present invention, there is provided a method of obtaining copper from sulfide ore including copper (hereinafter referred to as feedstock) comprising: providing the feedstock into acid solution, the acid solution including chloride and bromide of one of alkali metal and alkali earth metal, and one of chloride of copper and iron and bromide of copper and iron; leaching monovalent copper and divalent copper from the feedstock with use of oxidizing power of at least one of iron ion and copper ion in the acid solution, with air being blown into the acid solution under an atmospheric pressure at a temperature less than a boiling point of the acid solution; solid-liquid separating the acid solution after the leaching; blowing air into the solution after the solid-liquid separation; oxidizing copper in the solution; coprecipitating iron and impurity that are leached into the acid solution from the feedstock; extracting copper from the solution after the oxidizing from which deposition including the coprecipitate is separated; obtaining the extracted copper into sulfuric acid solution as copper sulfate; obtaining copper from the copper sulfate; and recycling hydrochloric acid generated in the extracting in another copper leaching.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
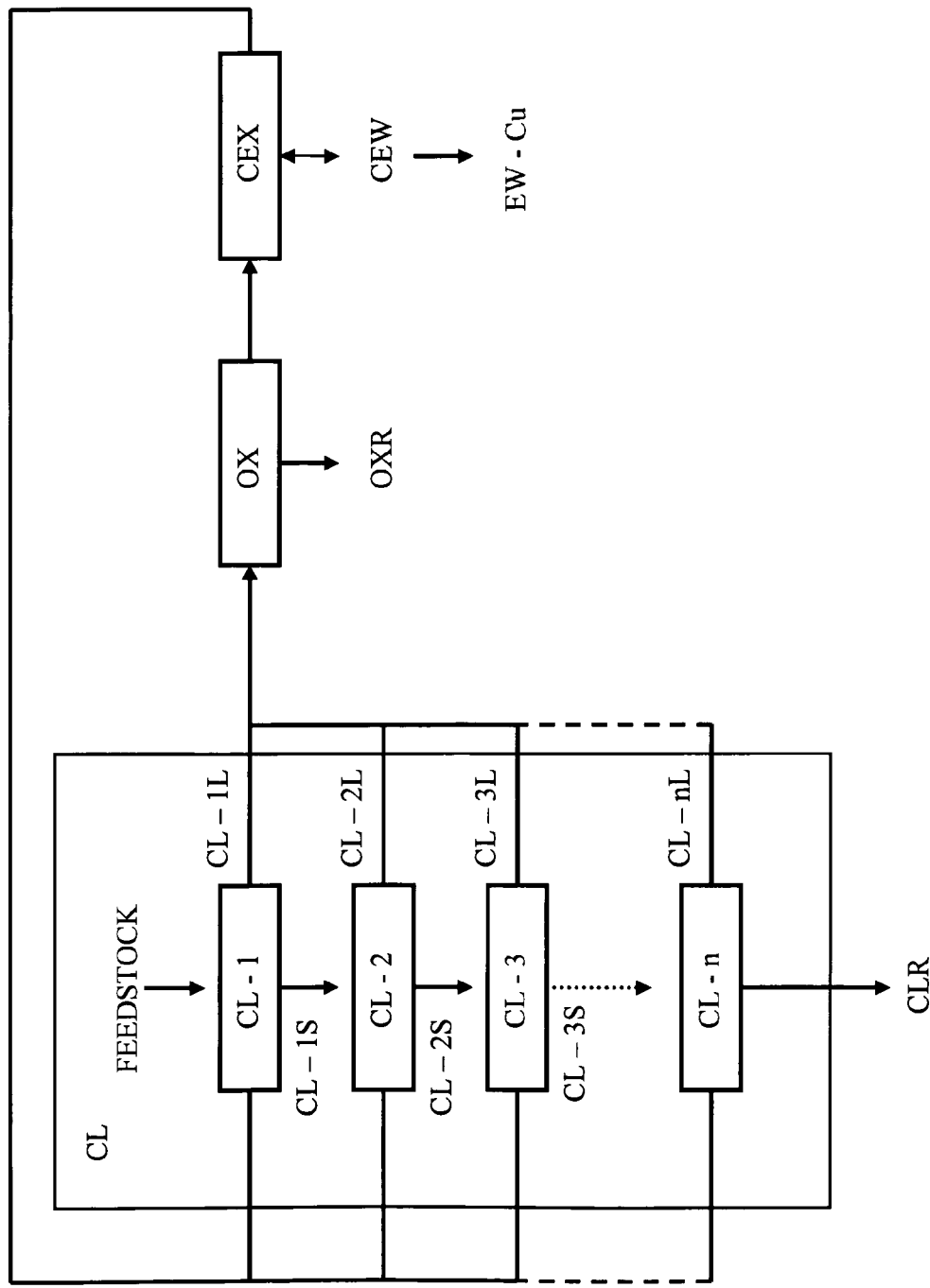
FIG. 1 illustrates a process of a method of obtaining copper in accordance with an embodiment.

A description will now be given of embodiments of the present invention with reference to FIG. 1. This process is shown as a copper leaching process CL, an oxidizing process OX, a copper extracting process CEX, and a copper obtaining process CEW in FIG. 1. FIG. 1 shows a concrete embodiment of the copper leaching process composed of four stages. The number of the stages is adjusted according to treated feedstock.

[Copper Leaching Process "CL"]

Feedstock is doped into a mixed solution including divalent copper chloride, iron chloride, sodium chloride and sodium bromide. Air is blown into the solution at atmospheric pressure at more than 70 degrees C. This results in a reaction between the air and the feedstock. Thus, the copper is leached out. In this case, the copper is eluted according to the following reaction equations of chalcopyrite that is typical copper sulfide ore.

$$CuFeS_2 + 3CuCl_2 \rightarrow 4CuCl + FeCl_2 + 2S \qquad [\text{Equation 1}]$$

$$CuFeS_2 + 3FeCl_3 \rightarrow CuCl + 4FeCl_2 + 2S \qquad [\text{Equation 2}]$$

With the reactions, leaching rate of approximately 30% to 75% may be obtained.

And the copper is leached out with the air being blown, at a part of the leaching process, preferably at latter part of the leaching process. This results in oxidations of monovalent copper and monovalent iron generated with the leaching reaction into divalent copper and divalent iron according to the following reaction equations, in parallel with the equation 1 or the equation 2.

$$CuCl + \tfrac{1}{4}O_2 + HCl \rightarrow CuCl_2 + \tfrac{1}{2}H_2O \qquad [\text{Equation 3}]$$

$$FeCl_2 + \tfrac{1}{4}O_2 + HCl \rightarrow FeCl_3 + \tfrac{1}{2}H_2O \qquad [\text{Equation 4}]$$

Chemical species generated with the equation 3 and the equation 4 may be recycled for the leaching as the oxidant of the equation 1 and the equation 2. This results in increase of the leaching rate. Monovalent copper chloride and monovalent iron chloride eluted from the feedstock are oxidized into divalent copper chloride and divalent iron chloride and the copper leaching reaction may be continued when the air is blown at the leaching reaction even if specific oxidant and specific halide (halex typically such as $BrCl_2^-$) are not provided, because the reactions of the equation 3 and the equation 4 progresses with the oxygen in the air blown into the solution.

In acid aqueous solution, the reaction progresses only with the chloride. Oxidation-reduction potential of the leaching reaction is reduced if bromide ion is included. This results in increase of the reaction rate and reduction of the reaction time. It is therefore preferable that the total concentration of the chloride ion and the bromide ion in a first acid aqueous solution is 120 g/L to 200 g/L, in order to realize the above-mentioned dissolution and the reaction at high efficiency.

It is preferable that milled and grinded feedstock is used in order to promote the copper leaching. In this case, it is preferable that grain size of 80% amount of the feedstock is less than 40 μm.

It is preferable that the concentration of the divalent copper chloride in the solution before the leaching is more than 20 g/L.

It is necessary that the leaching temperature is more than 70 degrees C. It is preferable that the leaching temperature is increased in order to promote the copper leaching reaction.

The copper may be leached out with only use of the divalent copper as the oxidant in the case of treating the ore such as copper sulfide ore in which iron is included only as impurity, although both the divalent copper and the divalent iron act as the oxidant in the above-mentioned embodiment.

[Leaching Process Composed of a Plurality of Stages]

There may be a case where reaction tanks are needed in order to leach the copper from the feedstock sufficiently, in the copper leaching process. In the case, the leaching solution flows from left to right in FIG. 1. On the other hand, leaching residue flows up to down in FIG. 1. Therefore, the flows crosses at right angle as shown in FIG. 1.

The leaching solution is solid-liquid separated or is concentrated with a filter press or a thickener, after each reaction of the stages of the copper leaching. The obtained residue or the concentrated slurry is given to the next copper leaching stage. The solution after the leaching separated at each copper leaching step is given to the copper extracting process mentioned later.

[Oxidizing Process "OX"]

Each solution after each copper leaching stage is mixed and air is blown into the mixed solution in order to oxidize the copper in the solution after the copper leaching. Thus, at least a part of the monovalent copper is oxidized. As shown in the equation 3, the oxygen and acid are consumed when the monovalent copper is oxidized. Therefore, pH of the solution is increased. And, iron is deposited and acid is generated as shown in the following reaction equation 5 according to the increase of pH.

$$FeCl_3 + 2H_2O \rightarrow FeO(OH) + 3HCl \qquad [\text{Equation 5}]$$

The oxidation of the copper shown in the equation 3 is progressed with use of the acid (HCl) generated in the equation 5. The pH of the solution is reduced when the oxidation of the copper is finished and the acid is left. And, the oxidation is finished when the reaction of the equation 5 is balanced It is preferable that a solution of which substantially all copper is monovalent copper is prepared by oxidizing a leaching solution including monovalent copper and divalent copper in advance in order to progress exchange reaction smoothly, in a case where anion-exchange type of organic extraction agent or solvent extraction agent is used in the copper obtaining.

The above-mentioned exchange reaction is progressed when the solution is filtered and separated with the filter press or the like, because iron and a part of the other impurity are deposited when the monovalent copper is oxidized into the divalent copper.

[Copper Obtaining Process "CEX" and "CEW"]

The copper is obtained from the solution generated in the above-mentioned oxidation process. The copper may be obtained with a known solvent extraction method, an ion-exchange method, an electrolytic winning method, an electrolytic displacing method or a combination thereof.

As disclosed in Document 1, reactions at an anode and a cathode are shown as the following reaction equations in a case where the copper is obtained with the electrolytic winning with use of chloride bath.

$$\text{Anode side: } 2Cu^+ + 2e^- \rightarrow 2Cu \qquad [\text{Equation 6}]$$

$$\text{Cathode side: } 2Cl^- + Br^- \rightarrow BrCl_2^-(\text{halex}) + 2e^- \qquad [\text{Equation 7}]$$

It is preferable that organic metal extraction agent or ion-exchange resin is used, in order to selectively obtain the copper from the leaching solution after the oxidation process. If the extraction agent and the resin are used, a proton is emitted into the solution and an acid is generated together with the copper extraction, as shown in the following reaction equation 8.

$$2R—H + CuCl_2 \rightarrow R_2—Cu + 2HCl \qquad [\text{Equation 8}]$$

("R" indicates a functional group of the organic metal extraction agent or the ion-exchange resin)

A desirable amount of chlorine necessary for the extraction of divalent copper chloride from the feedstock may be provided to the solution repeated to the leaching process after the oxidizing process and the copper extracting process in the form of monovalent iron chloride, divalent iron chloride, hydrochloric acid, or a combination thereof. The hydrochloric acid is generated in the reaction shown as the equation 8.

The amount of extracted copper is the amount of copper eluted from the feedstock in the leaching process. The copper remained in the solution after the leaching is repeated into another leaching process. The copper is used as oxidant in the leaching process. Therefore, the amount of the copper in the leaching solution is balanced. The solution after the copper leaching is repeated to another leaching process. The next leaching process uses the acid generated in the reaction shown in the equation 8 and the remained divalent copper.

It is possible to leach and obtain the copper without another chemicals.

Copper sulfate may be obtained from the extraction agent laundered briefly after the copper leaching with a back extraction method with use of dilute sulfuric acid, in a case where the organic metal extraction agent is used. Metallic copper may be obtained as shown in the following reaction equation 9 when an electric current decomposes the copper sulfate solution. The electrolytic winning (CEW) of the copper from the sulfuric acid bath is well known. It is therefore possible to obtain high-grade copper easily. The metallic copper is precipitated at the cathode in the case where the metallic copper is obtained from the copper sulfate solution with the decomposition by an electric current. On the other hand, the electric current decomposes water at the anode that is an electrode opposite to the cathode, and thus acid is generated as shown in the following reaction equation 10. The acid may be used for the back extraction of the copper from the extraction agent. It is therefore not necessary to dope another sulfuric acid. This results in reduction of reagent usage.

Cathode side: $CuSO_4 + 2e^- \rightarrow Cu + SO_4^{2-}$ [Equation 9]

Anode side: $H_2O \rightarrow 2H^+ + \frac{1}{2}O_2 + 2e^-$ [Equation 10]

The present invention has a following effect.

It is possible to treat a feedstock in an acid aqueous solution and react the feedstock at a temperature less than a boiling point of the aqueous solution under atmospheric pressure, without specific pretreatment. Therefore, the present invention does not need specific equipment. And it is possible to use the copper oxidized with oxygen in air blown into the solution and iron chloride and/or iron bromide as an oxidant. It is therefore possible to leach the copper without specific oxidant. The above-mentioned copper and iron are included in the feedstock. This results in reduction of reagent cost because the copper and the iron may be used for the copper leaching.

The acid aqueous solution has the above-mentioned component system. And the copper is leached in the chloride bath. Therefore, a passivation reaction is not occurred at a surface of the leaching material in contrast to the leaching in sulfuric acid bath. It is therefore possible to reduce the size of the reaction tank because the reaction time may be reduced. And it is possible to reduce equipment cost.

The copper leaching process in accordance with the present invention does not need specific equipment such as an autoclave, because the copper leaching is performed under an atmospheric pressure. The process needs only a combination of a reaction bath, a stirring device, and a simple device such as a thickener or a press filter. It is therefore possible to maintain the operation around a mine easily.

In the copper leaching, impurity such as arsenic is leached. The leached impurity is deposited in the oxidizing process. It is possible to avoid an effect of the impurity to the obtained copper and treat a high-impurity-grade feedstock by deposition-separation method.

The recycled solution for the leaching process is through the copper extracting process. Chloride reagent and bromide reagent are consumed little, because the solution is repeated in the leaching process. And it is not necessary to use corrosive reagent and high toxicant reagent as an oxidant.

The amount of the copper leached into the solution may be maintained constant when the amount of the feedstock doped into the leaching solution is controlled, even if the copper grade in the feedstock changes. It is possible to treat a low-copper-grade concentrate that is difficult to be treated in dry processing, because the concentration of the leached copper is maintained constant when the amount of the first acid aqueous solution is reduced with respect to the low-grade-copper feedstock. The method in accordance with the present invention may be applied to a low-copper-grade feedstock that is difficult to be treated in a dry processing. Therefore, the method is suitable for an ore that is not profitable with a conventional method. For example, the copper grade is low in a concentrate including 16 wt % of copper, 90 g/t of gold and 1250 ppm of arsenic as an impurity. Therefore, a gross amount of the low-copper-grade concentrate is enlarged when the low-copper-grade concentrate having the same amount of copper as another concentrate is transported. And a mine cost increases, because a ground and marine transportation cost from a mine to a smelting plant increases. And it is difficult to treat the low-copper-grade concentrate in the smelting plant, even if the concentration of impurity is high and the gold grade is high. This is because the low-copper-grade concentrate was developed as a gold concentrate at first.

The copper may be obtained with the electrolytic winning method with use of copper sulfate solution. And it is possible to produce high-grade electrolytic copper.

In a case of the multistage leaching, it is possible to increase the leaching rate of copper.

The flow of the treated object is simplified when one flow and the other flow are at right angle. It is therefore possible to reduce a size of equipment.

Copper leaching rate more than 98% is obtained, when air is blown at a temperature less than 100 degrees C.

An operation gets easier if copper is extracted with a known method.

The copper leaching is promoted and obtaining rate of copper is improved, when feedstock is milled.

EXAMPLE

First Example

A leaching solution was prepared and used. The leaching solution included 20 g/L copper in the form of divalent copper chloride, 2 g/L iron in the form of divalent iron chloride, 7 g/L of hydrochloric acid, 180 g/L chlorine ion in the form of copper chloride, hydrochloric acid, and iron chloride, and 22 g/L of bromide ion in the form of sodium bromide. Copper concentrate having a composition of 22 wt % Cu, 24 wt % Fe and 27 wt % S was milled into grains having 18 μm grain size in P80 value. The grains were used as feedstock. 400 g of the milled copper concentrate was doped into 4 L of the leaching solution. The leaching solution was heated to 85 degrees C. The copper concentrate was given into the leaching solution, with the leaching solution being stirred. Thus, the leaching was performed.

After a given reaction time, the leaching solution was filtered. The leached residue is subjected to the leaching process with the leaching solution again. This leaching process was repeated four times. A transition of copper grade in the leached residue was observed. The air was not blown at a first stage and a second stage and was blown at a third stage and a fourth stage at 1.0 L/min. Table 1 shows the result.

TABLE 1

RESULT OF FIRST EXAMPLE

| REACTION STAGE | REACTION TIME hrs. EACH STEP | TOTAL | REACTION TEMPERATURE DEGREES C. | AIR BLOW L/min | ORP at REACTION TERMINATION mv | PH at REACTION TERMINATION | COPPER GRADE IN RESIDUE % | COPPER LEACHING RATE % |
|---|---|---|---|---|---|---|---|---|
| BEFORE REACTION | 0 | 0 | | | | | 22 | 0.0 |
| 1 | 4.0 | 4.0 | 85 | 0 | 389 | 2.00 | 20 | 33.2 |
| 2 | 5.0 | 9.0 | 85 | 0 | 390 | 0.30 | 10 | 73.8 |
| 3 | 5.0 | 14.0 | 85 | 1.0 | 480 | 1.74 | 0.8 | 98.0 |
| 4 | 5.0 | 19.0 | 85 | 1.0 | 559 | 1.26 | 0.5 | 98.7 |

ORP in above Table is a value measured with use of Ag/AgCl as a reference electrode As shown in Table 1, the copper leaching rate was increased according to the total reaction time. The copper leaching rate was increased to 98% for the total reaction time of 14 hours through four stages, and was increased to 98.7% for the total reaction time of 19 hours through four stages.

Second Example

A leaching solution was prepared as a leaching solution before extraction. The leaching solution includes 10 g/L copper in the form of divalent copper chloride or monovalent copper chloride, 108 g/L chlorine ion at least in the form of copper chloride, and 13 g/L of bromide ion in the form of sodium bromide.

LIX984 was diluted with IsoperM and was used as an extraction agent. The extraction agent had 20 volume % of the LIX984. This leaching solution before the extraction and the extraction agent were mixed at a volume ratio of 1:1. After that, the mixed solution was left at rest, was divided into an organic phase and a water phase. Copper concentration in the water phase was measured. Table 2 shows the extraction condition and the results.

As shown in Table 2, the LIX984 did not leach $Cu^+$ but leached $Cu^{2+}$. Consequently, it is necessary to oxide $Cu^+$ in the solution after the leaching into $Cu^{2+}$, in the case of copper obtaining with the LIX984 in the solution after the leaching.

Third Example

The solution after the leaching of the copper concentration was air-oxidized, and was used as the solution before the extraction. The LIX984 was diluted with the IsoperM and was used as an extraction agent. The extraction agent had 20 volume % of the LIX984.

An organic phase after the extraction was laundered with pure water. The organic phase was subjected to a back extraction with 180 g/L dilute sulfuric acid. Further, the organic phase after the back extraction was laundered with pure water.

Each of the water phases was analyzed, and distributions of copper and halogen were measured.

Table 3 shows the examination condition and the results.

TABLE 2

LEACHING CONDITION AND RESULTS OF SECOND EXAMPLE

| EXAMINATION NUMBER | SOLUTION CONCENTRATION BEFORE LEACHING g/L | | | | | CONCENTRATION OF EXTRACTION AGENT vol. % | O/A RATIO | SOLUTION CONCENTRATION AFTER LEACHING | | | COPPER CONCENTRATION OF ORGANIC PHASE g/L* |
|---|---|---|---|---|---|---|---|---|---|---|---|
| | T-Cu | $Cu^+$ | $Cu^{2+}$ | Cl | Br | | | T-Cu | $Cu^+$ | $Cu^{2+}$ | |
| 1 | 10.5 | 0 | 10.5 | 113 | 14.3 | 20 | 1.0 | 4.5 | 0 | 4.5 | 6.0 |
| 2 | 9.8 | 8.0 | 1.8 | 118 | 16.9 | 20 | 1.0 | 8.8 | 6.7 | 2.1 | 1.0 |

TABLE 3

EXAMINATION CONDITION OF THIRD EXAMPLE

| OPERATION | USED LIQUID AMOUNT ml | | CONCENTRATION AND AMOUNT BEFORE EXTRACTION | | | | | |
|---|---|---|---|---|---|---|---|---|
| | WATER PHASE | ORGANIC PHASE | Cu | | Cl ION | | Br ION | |
| | | | CONCENTRATION g/L | AMOUNT g | CONCENTRATION g/L | AMOUNT g | CONCENTRATION g/L | AMOUNT g |
| EXTRACTION | 50 | 75 | 29.0 | 1.45 | 176 | 8.8 | 21.5 | 1.08 |
| FIRST LAUNDERING | 70 | 70 | 0 | 0 | 0 | 0 | 0 | 0 |
| BACK EXTRACTION | 65 | 65 | 0 | 0 | 0 | 0 | 0 | 0 |
| SECOND LAUNDERING | 60 | 60 | 0 | 0 | 0 | 0 | 0 | 0 |

EXAMINATION RESULT OF THIRD EXAMPLE

| OPERATION | CONCENTRATION AND AMOUNT AFTER EXTRACTION | | | | | | | |
|---|---|---|---|---|---|---|---|---|
| | Cu | | Cl ION | | Br ION | | $SO_4$ ION | |
| | CONCENTRATION g/L | AMOUNT g | CONCENTRATION g/L | AMOUNT g | CONCENTRATION g/L | AMOUNT g | CONCENTRATION g/L | AMOUNT g |
| EXTRACTION | 23.4 | 1.17 | 170 | 8.5 | 21.4 | 1.07 | — | — |
| FIRST LAUNDERING | <0.001 | — | 0.13 | 0.01 | <0.01 | <0.001 | — | — |
| BACK EXTRACTION | 4.0 | 0.28 | 0.002 | <0.001 | <0.01 | <0.001 | — | — |
| SECOND LAUNDERING | <0.001 | — | 0.002 | <0.001 | <0.01 | <0.001 | 2.2 | 0.132 |

As shown in Table 3, the copper in the organic phase was back-extracted into the water phase because of 180 g/L dilute sulfuric acid.

The organic phase after the extraction brought chlorine. It is therefore possible to remove the chlorine without a loss of copper, by laundering with pure water. The organic phase after the back extraction brought sulfuric acid ion. And it is possible to remove the sulfuric acid ion, by laundering with pure water.

The solution after the extraction had a composition of 23.4 g/L Cu, 170 g/L Cl and 21.4 g/L Br, and could be used as the solution before the leaching.

Fourth Example

A leaching solution was prepared and used. The leaching solution included 5 g/L to 20 g/L copper in the form of divalent copper chloride, 2 g/L iron in the form of divalent iron chloride, 7 g/L of hydrochloric acid, 180 g/L or 108 g/L chlorine ion in the form of copper chloride, hydrochloric acid, and iron chloride, and 22 g/L or 13 g/L of bromide ion in the form of sodium bromide. Copper concentrate having a composition of 22 wt % Cu, 24 wt % Fe and 27 wt % S was milled into grains having 18 μm grain size in P80 value. The grains were used as feedstock.

600 g of the milled copper concentrate was doped into 4 L of the leaching solution.

The leaching solution was heated to a given temperature. After that, the copper concentrate was given into the leaching solution, with the leaching solution being stirred. The leaching solution was subjected to the copper leaching, with air being blown into the leaching solution at 1.0 L/min. After a given reaction time, the leaching solution was filtered. The leached residue was subjected to the leaching process with the leaching solution again. This leaching process was repeated a few times. A transition of copper grade in the leached residue was observed. Table 4 shows the condition and the result.

TABLE 4

| EXAMINATION NUMBER | CONCENTRATION OF CHLORINE AND BROMINE g/L | | REACTION TEMPERATURE degrees C. | NUMBER OF REACTION STAGES | TOTAL REACTION TIME hrs. | BLOWN AIR L/min | COPPER GRADE OF FINAL RESIDUE % | COPPER LEACHING RATE % |
|---|---|---|---|---|---|---|---|---|
| | Cl | Br | | | | | | |
| 1 | 108 | 13 | 85 | 4 | 17.5 | 1.0 | 0.3 | 99.4 |
| 2 | 180 | 22 | 70 | 5 | 17.2 | 1.0 | 0.7 | 98.3 |
| 3 | 108 | 13 | 70 | 5 | 17.3 | 1.0 | 2.7 | 92.2 |
| 4 | 180 | 22 | 85 | 3 | 14.0 | 1.0 | 0.8 | 98.0 |
| COMPARATIVE EXAMINATION | 108 | 13 | 50 | 6 | 26.5 | 1.0 | 17.0 | 11.1 |

As shown in Table 4, the chlorine concentration, the bromine concentration and the reaction temperature affected the leaching rate of the copper. It is necessary that total of the chlorine concentration and the bromine concentration is at least more than 120 g/L and the reaction temperature is more than 70 degrees C., in order to reduce the copper grade in the leached residue to less than 1% in a short time. In a case where the copper was leached when the total of the chlorine concentration and the bromine concentration was 120 g/L and the reaction temperature was 70 degrees C., the copper grade in the leached residue was not reduced to less than 1% in a comparative reaction time.

As shown in the comparative example, the copper grade in the leached residue was decreased to only 17% and the copper leaching rate was increased to only 11.1% when the reaction temperature was 50 degrees C., even if the reaction time was more than 25 hours.

It is therefore demonstrated that the total of the chlorine concentration and the bromine concentration and the reaction temperature affect the reaction rate of the copper leaching.

Fifth Example

A leaching solution was prepared and used. The leaching solution included 20 g/L copper in the form of divalent copper chloride, 2 g/L iron in the form of divalent iron chloride, 7 g/L of hydrochloric acid, 180 g/L chlorine ion in the form of copper chloride, hydrochloric acid, and iron chloride, and 22 g/L of bromide ion in the form of sodium bromide. Copper concentrate having a composition of 23 wt % Cu, 24 wt % Fe and 27 wt % S was milled into grains having 41 μm grain size in P80 value. The grains were used as feedstock.

600 g of the milled copper concentrate was doped into 4 L of the leaching solution.

The leaching solution was heated to a given temperature. After that, the copper concentrate was given into the leaching solution, with the leaching solution being stirred. The leaching solution was subjected to the copper leaching, with air being blown into the leaching solution at 1.0 L/min. After a given reaction time, the leaching solution was filtered. The leached residue was subjected to the leaching process with the leaching solution again. This leaching process was repeated four times. A transition of copper grade in the leached residue was observed. The leaching temperature and the leaching time were 70 degrees C. and 2 hours at the first stage and the second stage and were 85 degrees C. and 5 hours at the third stage and the fourth stage. Table 5 shows the leaching condition and the result.

The copper grade in the leached residue was reduced to 0.6% and the copper leaching rate was increased to 98.3% through the four stages and for 14 hours in total, even if the grain size of the feedstock was 41 μm in P80 value.

It is possible to reduce the equipment cost because of the reduction of the reaction time and the operation cost because of the reduction of the heating energy, if the reaction time and the reaction temperature of each stage is controlled.

Sixth Example

A leaching solution was prepared and used. The leaching solution included 20 g/L copper in the form of divalent copper chloride, 2 g/L iron in the form of divalent iron chloride, 7 g/L of hydrochloric acid, 180 g/L chlorine ion in the form of copper chloride, hydrochloric acid, and iron chloride, and 22 g/L of bromide ion in the form of sodium bromide. Copper concentrate having a composition of 23 wt % Cu, 24 wt % Fe and 27 wt % S was milled into grains having 41 μm grain size in P80 value. The grains were used as feedstock.

The copper leaching was repeated four times. The solutions after the filtering were mixed to each other. 4 L of the mixed solution was extracted, and was used as the solution before the oxidation.

The solution before the oxidation was heated to a given temperature. After that, the oxidation was performed, with air being blown into the solution before the oxidation at 1.0 L/min. After a given reaction time, the solution after the oxidation was filtered. The solution after the oxidation and the leached residue were analyzed. Table 6 shows the results of the oxidation.

TABLE 6

| | AMOUNT | Cu g/L | Cu G | Fe g/L | Fe g | As mg/L | As g |
|---|---|---|---|---|---|---|---|
| SOLUTION BEFORE OXIDATION | 4.0 L | 28.5 | 114.0 | 3.8 | 15.3 | 46.7 | 0.19 |
| SOLUTION AFTER OXIDATION | 4.1 L | 28.2 | 116.3 | 1.3 | 5.4 | <1 | <0.01 |
| RESIDUE AFTER OXIDATION | 17.57 g | 0.2* | 0.0 | 48.0* | 8.4 | 0.73* | 0.13 |

*shown in percent

As shown in Table 6, the impurity As included in the solution before the oxidation was emitted as the oxidation

TABLE 5

RESULT OF FIFTH EXAMPLE

| REACTION STAGE | REACTION TIME hrs. EACH STEP | REACTION TIME hrs. TOTAL | REACTION TEMPERATURE DEGREES C. | AIR BLOW L/min | ORP at REACTION TERMINATION mv | PH at REACTION TERMINATION | COPPER GRADE IN RESIDUE % | COPPER LEACHING RATE % |
|---|---|---|---|---|---|---|---|---|
| BEFORE REACTION | 0 | 0 | | | | | 23 | 0.0 |
| 1 | 2.0 | 2.0 | 70 | 1.0 | 413 | 1.94 | 21 | 14.0 |
| 2 | 2.0 | 4.0 | 70 | 1.0 | 431 | 1.87 | 17 | 38.8 |
| 3 | 5.0 | 9.0 | 85 | 1.0 | 422 | 1.85 | 5.3 | 83.5 |
| 4 | 5.0 | 14.0 | 85 | 1.0 | 511 | 1.51 | 0.6 | 98.3 |

ORP in above Table is a value measured with use of Ag/AgCl as a reference electrode.

residue. Therefore, the copper may be obtained without impurity in the system. Thus, a high grade copper may be obtained. And it is possible to treat high-impurity-grade feedstock that could not be treated.

It is possible to reduce the equipment size and amount of chemicals, when leaching reaction of ore is promoted. It is possible to reduce cost when the leaching is performed under atmospheric pressure and at less than a boiling point. And it is possible to treat feedstock that is not suitable for dry processing.

The present invention is not limited to the specifically disclosed embodiments, but include other embodiments and variations without departing from the scope of the present invention.

The present application is based on Japanese Patent Application No. 2008-084934 filed on Mar. 27, 2008, the entire disclosure of which is hereby incorporated by reference.

What is claimed is:

1. A method of obtaining copper from sulfide ore including copper (hereinafter referred to as feedstock) comprising:
   providing the feedstock into acid solution, the acid solution including chloride and bromide of one of alkali metal and alkali earth metal, and one of chloride of copper and iron and bromide of copper and iron;
   leaching monovalent copper and divalent copper from the feedstock with use of oxidizing power of at least one of iron ion and copper ion in the acid solution, with air being blown into the acid solution under an atmospheric pressure at a temperature less than a boiling point of the acid solution;
   solid-liquid separating the acid solution after the leaching;
   blowing air into the solution after the solid-liquid separation;
   oxidizing copper in the solution;
   coprecipitating iron and impurity that are leached into the acid solution from the feedstock;
   extracting copper from the solution after the oxidizing from which deposition including the coprecipitate is separated;
   obtaining the extracted copper into sulfuric acid solution as copper sulfate;
   obtaining copper from the copper sulfate; and
   recycling hydrochloric acid generated in the extracting in another copper leaching, wherein:
   the step of leaching the copper includes a plurality of leaching stages in which leached residue is moved to next stage in order;
   the solution after the leaching of monovalent copper and divalent copper is distributed into each of the leaching stages; and
   each solution after the leaching is extracted and mixed, and is used in the oxidizing.

2. The method as claimed in claim 1, wherein total of chloride ion and bromide ion in the acid solution is 120 g/L to 200 g/L.

3. The method as claimed in claim 1, wherein the copper is leached at a temperature more than 70 degrees C.

4. The method as claimed in claim 1 wherein the leached copper is obtained with one of solvent extraction method, ion-exchange method, electrolytic winning method, electrolytic displacing method and a combination thereof.

5. The method as claimed in claim 1, further comprising milling and grinding more than 80% of the feedstock into grains having grain size of less than 40 μm.

* * * * *